US012658513B2

(12) United States Patent
Fujita et al.

(10) Patent No.: US 12,658,513 B2
(45) Date of Patent: Jun. 16, 2026

(54) BUSHING FOR LEAD-ACID BATTERY AND LEAD-ACID BATTERY

(71) Applicant: GS Yuasa International Ltd., Kyoto (JP)

(72) Inventors: Sousuke Fujita, Kyoto (JP); Kazuki Tada, Kyoto (JP); Takatomo Takemitsu, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 664 days.

(21) Appl. No.: 18/021,735

(22) PCT Filed: Aug. 19, 2021

(86) PCT No.: PCT/JP2021/030345
§ 371 (c)(1),
(2) Date: Feb. 16, 2023

(87) PCT Pub. No.: WO2022/039217
PCT Pub. Date: Feb. 24, 2022

(65) Prior Publication Data
US 2023/0335840 A1 Oct. 19, 2023

(30) Foreign Application Priority Data
Aug. 20, 2020 (JP) ................................. 2020-139165

(51) Int. Cl.
*H01M 50/188* (2021.01)
*H01M 10/12* (2006.01)

(52) U.S. Cl.
CPC ......... *H01M 50/188* (2021.01); *H01M 10/12* (2013.01)

(58) Field of Classification Search
CPC ..... H01M 50/188; H01M 50/20; H01M 10/12
See application file for complete search history.

(56) References Cited

U.S. PATENT DOCUMENTS

| 1,463,788 A | * | 8/1923 | Barna | ..................... H01M 4/72 |
| | | | | 429/243 |
| 4,444,853 A | | 4/1984 | Halsall et al. | |

(Continued)

FOREIGN PATENT DOCUMENTS

| JP | 60-25148 A | 2/1985 |
| JP | 61-8847 A | 1/1986 |

(Continued)

OTHER PUBLICATIONS

International Search Report (ISR) dated Oct. 19, 2021 filed in PCT/JP2021/030345.

*Primary Examiner* — Kenneth J Douyette
(74) *Attorney, Agent, or Firm* — RANKIN, HILL & CLARK LLP

(57) ABSTRACT

A bushing (40A) for a lead-acid battery includes: a cylindrical bushing main body portion (41) that can be fitted to a pole (45); and a columnar terminal portion (50) located at a position offset from the bushing main body portion (41) in plan view, in which the terminal portion (50) includes: a pedestal portion (52) integrally coupled to the bushing main body portion (41) via a coupling portion; and a connecting portion (51) which is located on the pedestal portion (52) and to which an external terminal is connected, and in which the pedestal portion (52) has a recessed cavity portion (53) on a bottom surface of the pedestal portion (52).

6 Claims, 7 Drawing Sheets

(56)                    References Cited

U.S. PATENT DOCUMENTS

| | | | |
|---|---|---|---|
| 4,701,386 A | 10/1987 | Kump et al. |
| 2014/0363722 A1 | 12/2014 | Osaki |

FOREIGN PATENT DOCUMENTS

| | | |
|---|---|---|
| JP | 11-283610 A | 10/1999 |
| JP | 11-339765 A | 12/1999 |
| JP | 2002-313315 A | 10/2002 |
| JP | 2005-310425 A | 11/2005 |
| JP | 2008-130348 A | 6/2008 |
| JP | 2013-55013 A | 3/2013 |
| JP | 2014-238980 A | 12/2014 |
| JP | 2015-118805 A | 6/2015 |

* cited by examiner

BUSHING FOR LEAD-ACID BATTERY AND LEAD-ACID BATTERY

TECHNICAL FIELD

The present invention relates to a bushing used for a lead-acid battery.

BACKGROUND ART

As a structure of a bushing for a lead-acid battery, a structure in which an external terminal is coaxially attached to a bushing through which a pole penetrates is known (Patent Document 1 below).

PRIOR ART DOCUMENT

Patent Document

Patent Document 1: JP-A-2015-118805

SUMMARY OF THE INVENTION

Problems to be Solved by the Invention

When a terminal portion is offset with respect to a bushing main body portion, it is conceivable that the bushing main body portion and the terminal portion are integrally coupled by a coupling portion. If the stress remaining in the bushing is large, the strength of the bushing decreases, and the bushing is likely to break when an external force is applied to the bushing.

The present invention has been completed based on the above circumstances, and discloses a technique for reducing stress remaining in a bushing for a lead-acid battery to increase the strength of the bushing.

Means for Solving the Problems

A bushing for a lead-acid battery includes: a cylindrical bushing main body portion that can be fitted to a pole; and a columnar terminal portion located at a position offset from the bushing main body portion in plan view, in which the terminal portion includes: a pedestal portion integrally coupled to the bushing main body portion via a coupling portion; and a connecting portion which is located on the pedestal portion and to which an external terminal is connected, and in which the pedestal portion has a recessed cavity portion on a bottom surface of the pedestal portion.

The present invention can be applied to a lead-acid battery.

MODE FOR CARRYING OUT THE INVENTION

<Outline of Bushing for Lead-Acid Battery>

Figure 1:
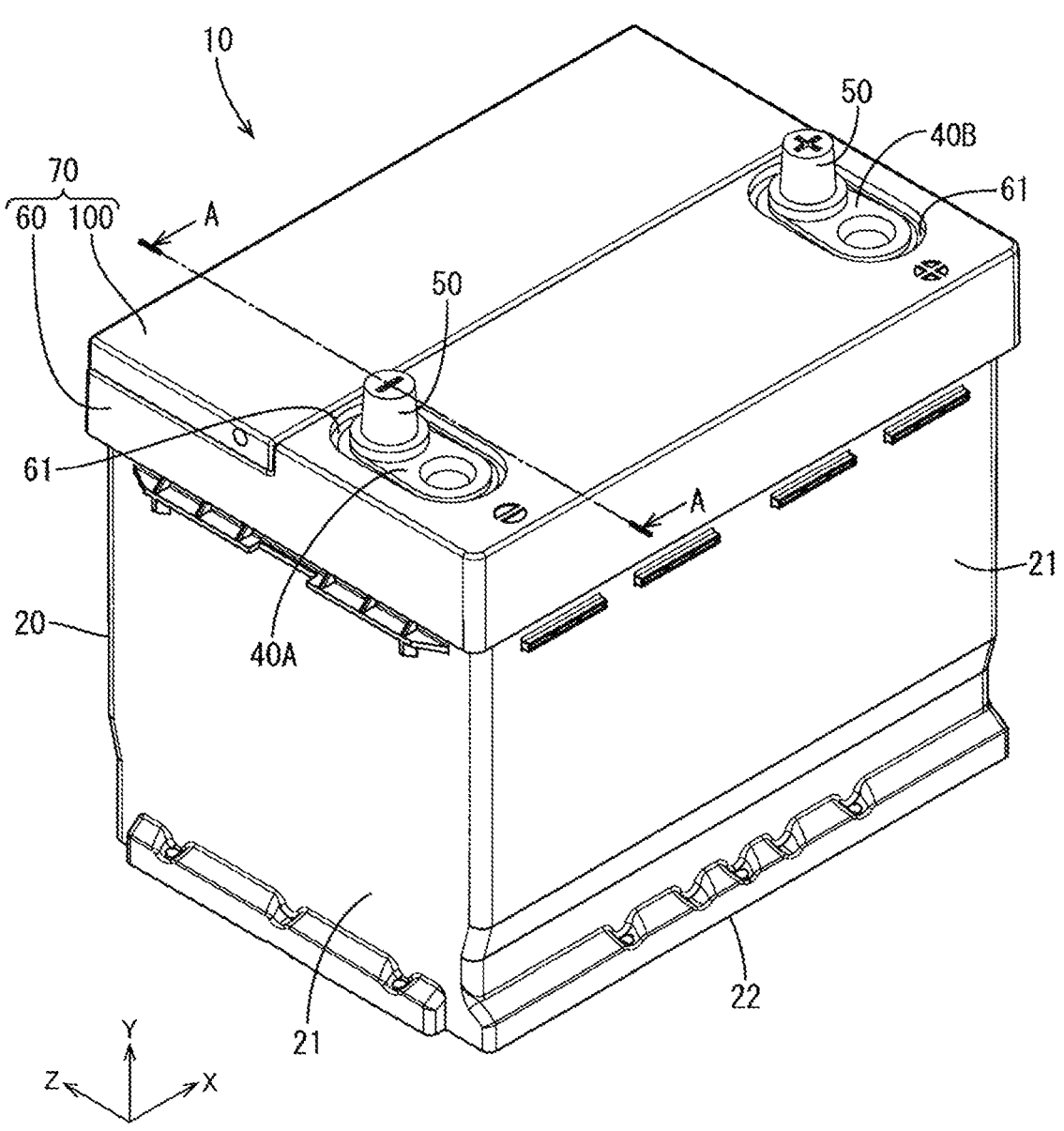
FIG. 1 is a perspective view of a lead-acid battery according to an embodiment of the present invention.

A bushing for a lead-acid battery disclosed in the present specification includes: a cylindrical bushing main body portion that can be fitted to a pole; and a columnar terminal portion located at a position offset from the bushing main body portion in plan view, in which the terminal portion includes: a pedestal portion integrally coupled to the bushing main body portion via a coupling portion; and a connecting portion which is located on the pedestal portion and to which an external terminal is connected, and in which the pedestal portion has a recessed cavity portion on a bottom surface of the pedestal portion.

As will be described later, since the bushing is embedded in an inner lid except for a part thereof, the bushing is fixed to the inner lid. When an external force is applied to the connecting portion, stress concentrates on the pedestal portion of the terminal portion, and there is a concern that the bushing breaks. In a case where the recessed cavity portion is provided on the bottom surface of the pedestal portion, the residual stress of the pedestal portion is relaxed as compared with a case where the cavity portion is not provided, and the strength of the pedestal portion can be enhanced. By increasing the strength of the pedestal portion, it is possible to suppress the bushing from being broken when an external force is applied to the terminal portion. By providing the cavity portion, the amount of material used is reduced, and the cost and weight of the bushing can be reduced.

A ceiling surface of the cavity portion may be located below the connecting portion. Since the cavity portion does not overlap the connecting portion in the vertical direction, it is possible to increase the strength of the connecting portion as compared with the case where the cavity portion overlaps the connecting portion. This makes it possible to suppress deformation of the connecting portion when an external force is applied.

On a current path from the terminal portion to the bushing main body portion via the coupling portion, a cross-sectional area of the coupling portion may be made smaller than a cross-sectional area of other portions when the cross-sectional areas of current paths are compared.

By fusing the coupling portion, an overcurrent can be cut off to protect the lead-acid battery. Since the coupling portion is located outside the lead-acid battery, it is possible to prevent fragments associated with fusing from being mixed into the lead-acid battery. In addition, the presence or absence of fusing can be easily visually recognized from the outside of the lead-acid battery.

The terminal portion (the connecting portion and the pedestal portion) may have a stepped columnar shape, and a diameter of the pedestal portion may be larger than a diameter of the connecting portion. By making the diameter of the pedestal portion larger than the diameter of the connecting portion, it is possible to increase the strength of the pedestal portion and suppress the breakage of the bushing. When the diameter of the pedestal portion is large, the volume of the space of the cavity portion can be increased, so that the residual stress can be reduced. Furthermore, by increasing the volume of the space of the cavity portion, the amount of material used can be further reduced, and the cost and the weight of the bushing can be further reduced.

A lead-acid battery may include the bushing for a lead-acid battery. The cavity portion of the pedestal portion of the lead-acid battery may be fitted with a boss portion of a lid member of the lead-acid battery.

<Embodiment>

An embodiment of the present invention will be described with reference to FIGS. 1 to 8.

1. Structure of Lead-Acid Battery 10

Figure 2:
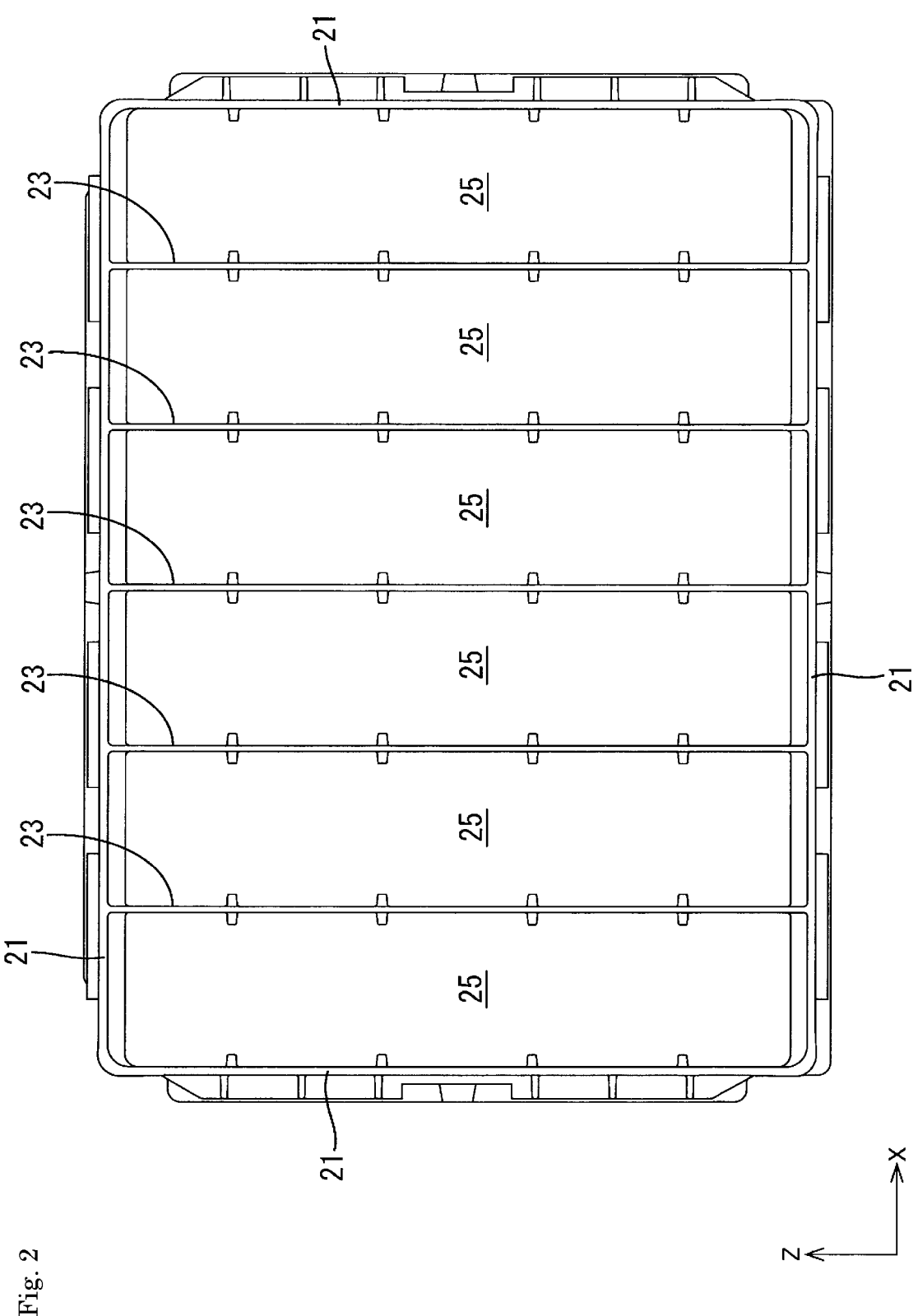
FIG. 2 is a plan view of a container.
Figure 3:
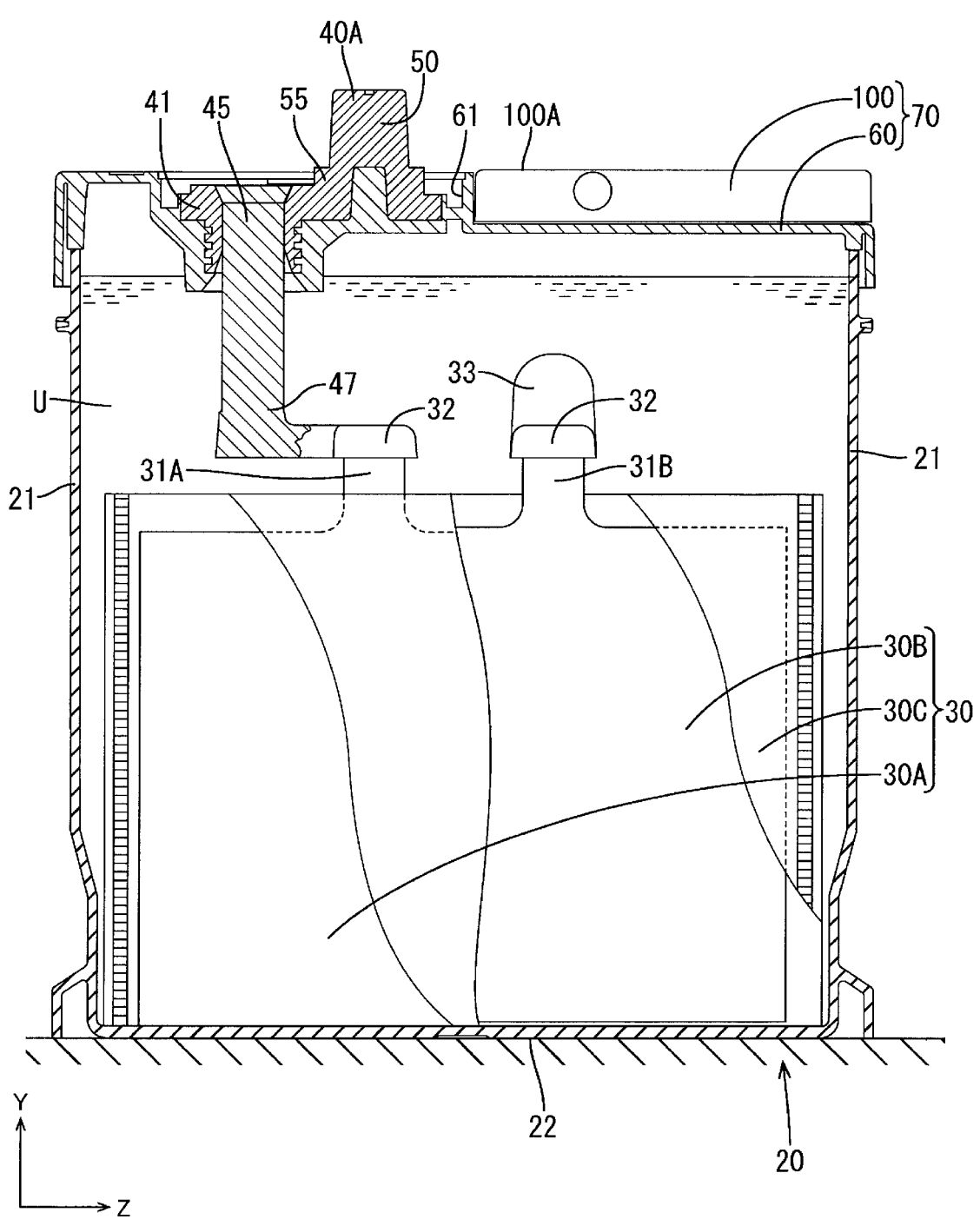
FIG. 3 is a vertical cross-sectional view of the lead-acid battery (cross-sectional view taken along line A-A in FIG. 1).

As shown in FIGS. 1 to 3, a lead-acid battery 10 includes a container 20, elements 30 which are power generating elements, an electrolyte solution U, and a lid member 70. In the following description, a lateral width direction (arrangement direction of bushings 40A and 40B) of the container 20 is an X direction, a height direction of the container 20 is a Y direction (vertical direction), and a depth direction is a Z direction. The XZ plane is a horizontal plane.

The container 20 is made of a synthetic resin, includes four outer walls 21 and a bottom wall 22, and has a box shape with an open upper surface. As shown in FIG. 2, the inside of the container 20 is partitioned into a plurality of cell chambers 25 by partition walls 23. The plurality of cell chambers 25 are provided in six chambers in the lateral width direction (X direction in FIG. 2) of the container 20, and each cell chamber 25 accommodates the element 30 together with the electrolyte solution U.

As shown in FIG. 3, the element 30 includes a positive electrode plate 30A, a negative electrode plate 30B, and a separator 30C which partitions both the electrode plates 30A and 30B. Each of the plates 30A and 30B is formed by filling a grid with an active material, and lug portions 31A and 31B are provided on the upper portions of the plates 30A and 30B. The lug portions 31A and 31B are provided to couple the plates 30A and 30B having the same polarity in the cell chamber 25 via straps 32.

The straps 32 have, for example, a plate shape elongated in the X direction, and are provided for a positive electrode and a negative electrode for each cell chamber 25. By electrically connecting the positive and negative straps 32 of the adjacent cell chambers 25 to each other via strap connecting portions 33 formed on the straps 32, the elements 30 of the cell chambers 25 are connected in series.

The lid member 70 includes an inner lid 60 and an upper lid 100. The inner lid 60 is made of a synthetic resin and has a size capable of sealing the upper surface of the container 20. On the back surface of the inner lid 60, a lid partition wall (not shown) is formed corresponding to the partition walls 23. The inner lid 60 is attached so as to overlap the container 20, seals the upper surface of the container 20, and has a structure for sealing each cell chamber 25 in the container 20 in an airtight and watertight manner. Similarly to the inner lid 60, the upper lid 100 is made of a synthetic resin, and is attached to the upper surface of the inner lid 60 in an overlapping manner. As shown in FIG. 3, an upper surface 100A of the upper lid 100 is located below an upper end of the bushing 40A.

The inner lid 60 is thermally welded to the container 20. The upper lid 100 is thermally welded to the inner lid 60.

2. Bushings 40A and 40B for Lead-Acid Battery

The lead-acid battery 10 includes two bushings 40A and 40B. The bushing 40A is for a negative electrode, and the bushing 40B is for a positive electrode. Since the two bushings 40A and 40B have the same structure, the structure of the bushing 40A on the negative electrode side will be described below as an example.

In the following description, the shapes of a bushing main body portion 41, a terminal portion 50, and the like are described as a cylindrical shape or a columnar shape, but the peripheral surface is tapered for the purpose of improving moldability.

Figure 4:
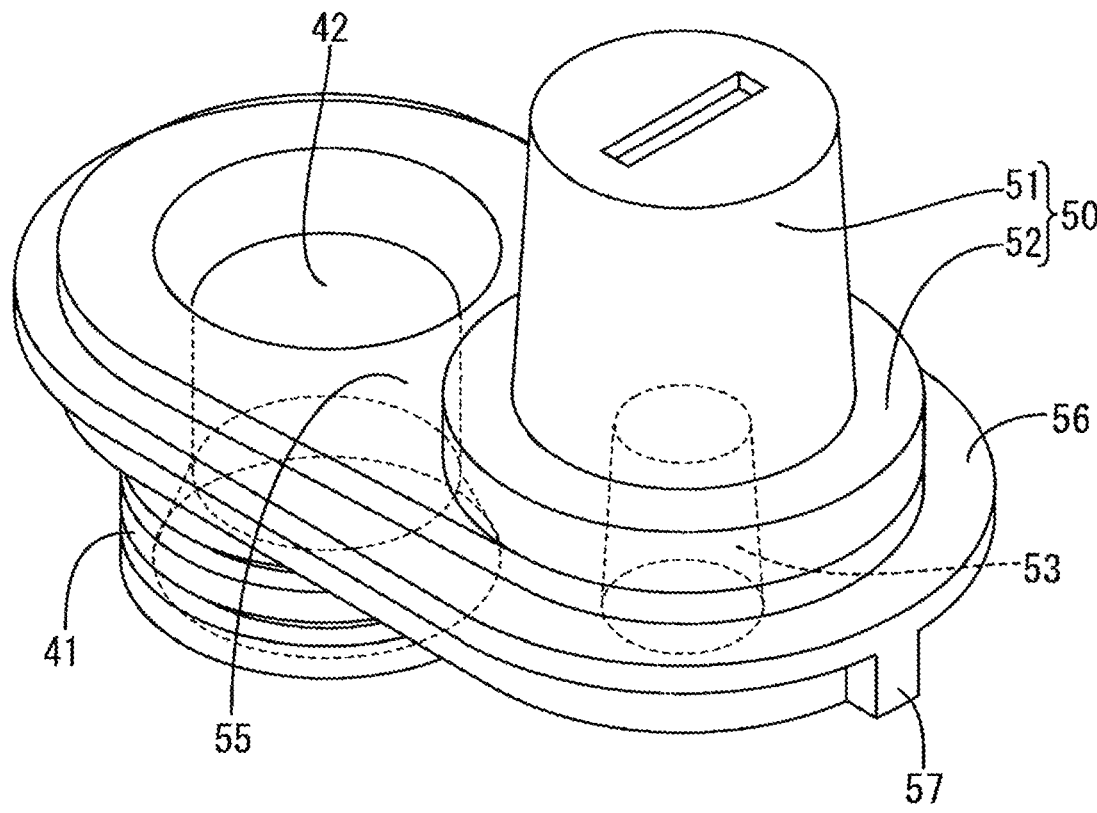
FIG. 4 is a perspective view of a bushing.
Figure 5:
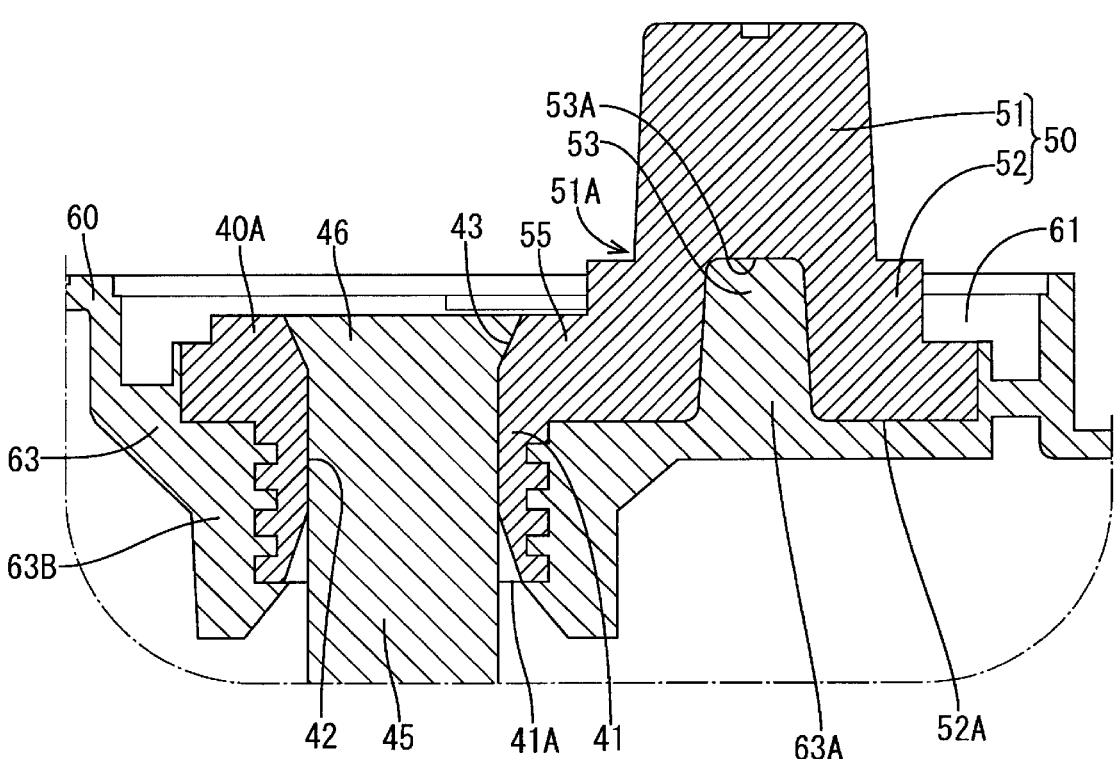
FIG. 5 is an enlarged cross-sectional view of the bushing embedded in an inner lid.

As shown in FIGS. 4 and 5, the bushing 40A on the negative electrode side includes the bushing main body portion 41, a coupling portion 55, and the terminal portion 50.

The bushing main body portion 41 has a cylindrical shape with the vertical direction as an axis, and has an annular groove on the outer periphery. The bushing main body portion 41 has a shaft hole 42 vertically penetrating the center portion. A columnar pole 45 is located inside the shaft hole 42. The pole 45 is made of a metal such as a lead alloy.

The pole 45 is inserted into the shaft hole 42 of the bushing main body portion 41 from below, and there is no step between an upper end portion 46 of the pole 45 and an upper end portion 43 of the bushing main body portion 41, and the upper end portion 46 and the upper end portion 43 are in a substantially flat state. The pole 45 and the bushing main body portion 41 are welded, and the melted lead alloy flows into between the bushing main body portion 41 and the pole 45, so that they are joined without a gap. The pole 45 is longer than the bushing main body portion 41, and the lower portion of the pole 45 protrudes downward from a lower surface 41A of the bushing main body portion 41. A base end portion 47 of the pole 45 is joined to the strap 32 of the element 30.

The terminal portion 50 has a columnar shape of two stages having different diameters. The lower stage is a pedestal portion 52, and the upper stage is a connecting portion 51. An external terminal (not shown) provided at an end portion of a wire harness is assembled to the connecting portion 51, and power can be supplied from the lead-acid battery 10 to the load via the wire harness.

The pedestal portion 52 has a larger diameter than the connecting portion 51 and includes a circular bottom surface 52A. The pedestal portion 52 has a cavity portion 53 on the bottom surface 52A. The cavity portion 53 is a recessed space which is located at a center portion (axial center portion) of the bottom surface 52A and extends upward from the bottom surface 52A. The cross-sectional shape of the cavity portion 53 is circular. In the cavity portion 53, the inner diameter of the cavity portion 53 decreases from the lower side to the upper side. The cavity portion 53 is tapered similarly to the connecting portion 51 and the like. A ceiling surface 53A of the cavity portion 53 is located below a lower end 51A of the connecting portion 51, and the cavity portion 53 does not overlap the connecting portion 51 in the vertical direction.

As shown in FIGS. 4 and 5, the position of the terminal portion 50 is offset in the Z direction (the right direction in FIG. 5) from the bushing main body portion 41 in plan view (when viewed from the direction B in FIGS. 4 and 5). The B direction is a direction parallel to the protruding direction of the terminal portion 50, and is a direction parallel to the connecting direction of the connecting portion 51 and the pedestal portion 52. The B direction corresponds to the Y direction (vertical direction) in the present embodiment.

The coupling portion 55 has an oval shape elongated in the Z direction. One arc of the coupling portion 55 has a center coinciding with the terminal portion 50, and the other arc has a center coinciding with the bushing main body portion 41. The coupling portion 55 overlaps the entire pedestal portion 52 and the entire bushing main body portion 41 in plan view, and integrally couples the pedestal portion 52 and the bushing main body portion 41. When viewed from the horizontal direction, with the coupling portion 55 as a boundary, substantially the entire terminal portion 50 including the pedestal portion 52 protrudes upward, and the bushing main body portion 41 protrudes downward.

A flange 56 projecting in the horizontal direction is provided on the entire peripheral surface of the coupling portion 55. Protrusions 57 are provided on both sides of the lower surface of the flange 56 in the Z direction. Protrusions 57 are provided to prevent the bushing 40A from rotating relative to the inner lid 60.

The entire bushing 40A is made of a metal such as a lead alloy, and the bushing main body portion 41, the coupling portion 55, and the terminal portion 50 are integrated. The bushing 40A can be integrally molded by casting, for example.

As shown in FIG. 1, the inner lid 60 includes attachment portions 61 on both sides of the upper surface in the X direction. The two attachment portions 61 are oval recesses elongated in the Z direction, and the bushings 40A and 40B are located inside. As shown in FIG. 5, a bottom wall 63 of the attachment portion 61 includes a boss portion 63A fitted in the cavity portion 53 and a surrounding portion 63B surrounding the outer surface of the bushing main body portion 41, and covers the lower outer periphery of the bushing 40A without any gap.

The inner lid 60 is integrally molded by causing a molten resin to flow in a mold into which the bushings 40A and 40B are inserted, and the two bushings 40A and 40B are fixed to the inner lid 60. As shown in FIG. 5, only the terminal portion 50 of the bushing 40A protrudes from the upper surface of the inner lid 60, and the other portion is located inside the attachment portion 61, so that it is difficult for a hand to touch a portion other than the terminal of the bushing 40A.

Figure 6:
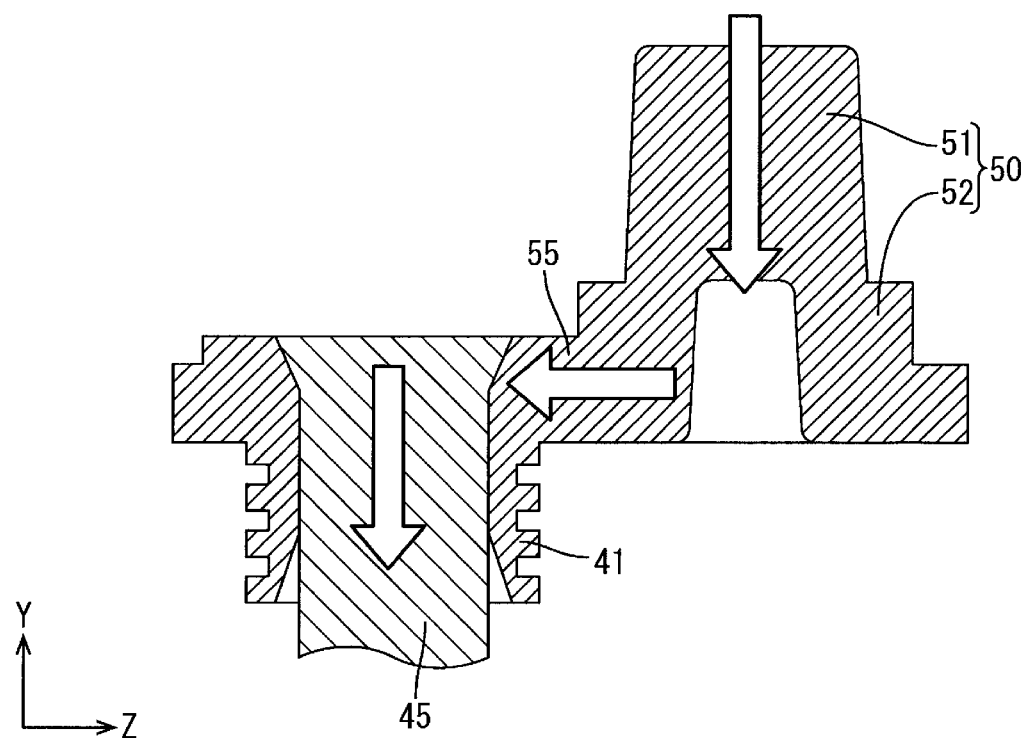
FIG. 6 is a view showing a direction of a current flowing through the bushing.

When the lead-acid battery 10 is charged, a current flows through the path of the terminal portion 50 (the connecting portion 51 and the pedestal portion 52), the coupling portion 55, and the bushing main body portion 41 in the bushing 40A as indicated by arrows in FIG. 6, and a current flows through the reverse path during discharging. The direction of the current in the terminal portion 50 and the bushing main body portion 41 is the Y direction, and the direction of the current in the coupling portion 55 is the Z direction.

When the cross-sectional areas of the current paths are compared, the cross-sectional area of the coupling portion 55 between the terminal portion 50 and the bushing main body portion 41 is made smaller than the cross-sectional areas of the other portions (the terminal portion 50 and the bushing main body portion 41), so that when an overcurrent flows, the coupling portion 55 is fused and the overcurrent can be cut off.

Figure 7:
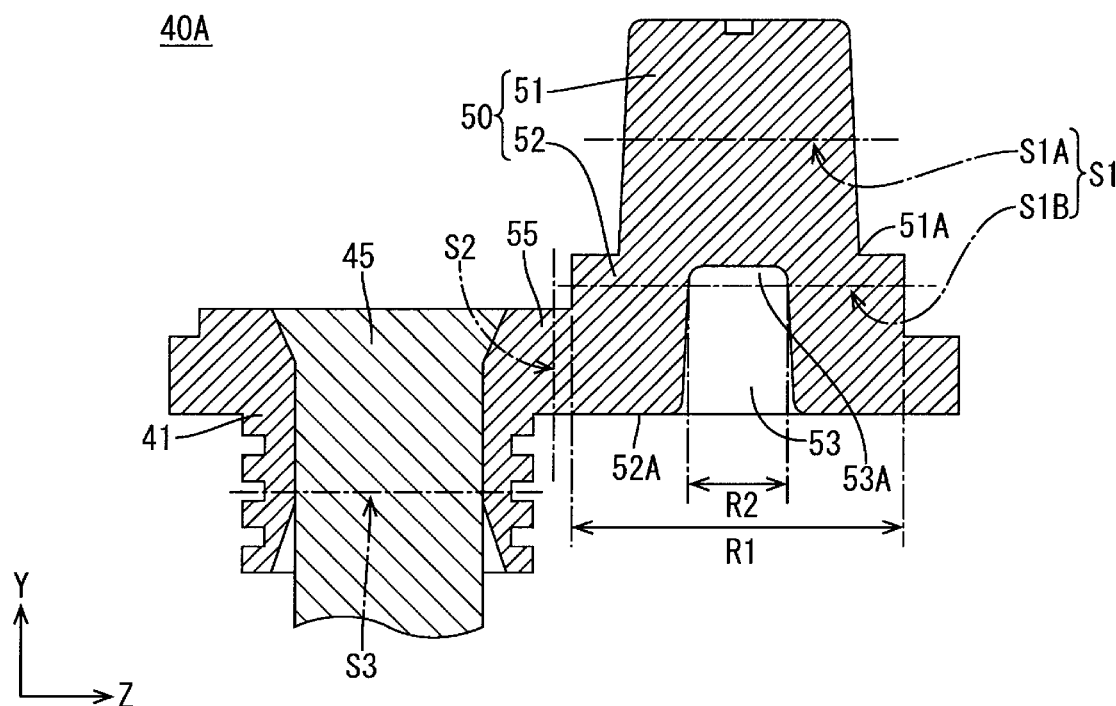
FIG. 7 is a cross-sectional view of the bushing.

Hereinafter, the cross-sectional area of each portion of the current path will be specifically described. As shown in FIG. 7, a cross-sectional area of a cross section of the terminal portion 50 in a direction orthogonal to the current direction (Y direction) is defined as S1.

The connecting portion 51 of the terminal portion 50 has a columnar shape with the Y direction as an axis, and has a circular cross-sectional shape. Since the side surface of the connecting portion 51 is tapered in a direction in which the upper side is narrowed, the diameter of the circle becomes smaller as the position of the cross section is higher, and a cross-sectional area S1A of the connecting portion 51 becomes smaller. The size of the cross-sectional area S1A is determined by the diameter of the column forming the connecting portion 51. A minimum value among values that can be taken by the cross-sectional area S1A when the position of the cross-section is changed along the Y direction is defined as a minimum cross-sectional area S1Amin.

The pedestal portion 52 of the terminal portion 50 has a columnar shape as a whole, but the recessed cavity portion 53 is provided in the bottom surface 52A. The cross section at the position including the cavity portion 53 is a remaining portion obtained by removing the concentric cavity portion 53 from the peripheral circle of the pedestal portion 52, and the shape thereof is an annular shape. A cross-sectional area S1B of the pedestal portion 52 is the area of the annular ring. The cross-sectional area S1B is determined by two values of the outer diameter of the pedestal portion 52 and the outer diameter of the cavity portion 53. A minimum value among values that can be taken by the cross-sectional area S1B when the position of the cross-section is changed along the Y direction is defined as a minimum cross-sectional area S1Bmin.

A smaller one of the minimum cross-sectional area S1Amin of the connecting portion 51 and the minimum cross-sectional area S1Bmin of the pedestal portion 52 is defined as a minimum cross-sectional area S1min of the terminal portion 50.

Next, a cross-sectional area of a cross section of the coupling portion 55 in a direction orthogonal to the current direction (Z direction) is defined as S2. In the coupling portion 55, a minimum value among values that can be taken by the cross-sectional area S2 when the position of the cross section is changed along the Z direction between the terminal portion 50 and the bushing main body portion 41 is defined as a minimum cross-sectional area S2min.

Next, a cross-sectional area of a cross section of the bushing main body portion 41 in a direction orthogonal to the current direction (Y direction) is defined as S3.

The current flows not only through the bushing main body portion 41 but also through the pole 45 welded to the bushing main body portion 41. The cross-sectional area S3 of the bushing main body portion 41 as the current path is the total cross-sectional area of the bushing main body portion 41 and the pole 45 welded to the bushing main body portion 41. A minimum value among values that can be taken by the cross-sectional area S3 when the position of the cross-section is changed along the Y direction is defined as a minimum cross-sectional area S3min.

The cross-sectional shape of the coupling portion 55 is determined such that the minimum cross-sectional area S2min of the coupling portion 55 is smaller than the minimum cross-sectional area S1min and the minimum cross-sectional area S3min of the other portions 41 and 50 when the cross-sectional areas of the current paths are compared, whereby the coupling portion 55 is fused when an overcurrent flows.

3. Description of Effects

Figure 8:
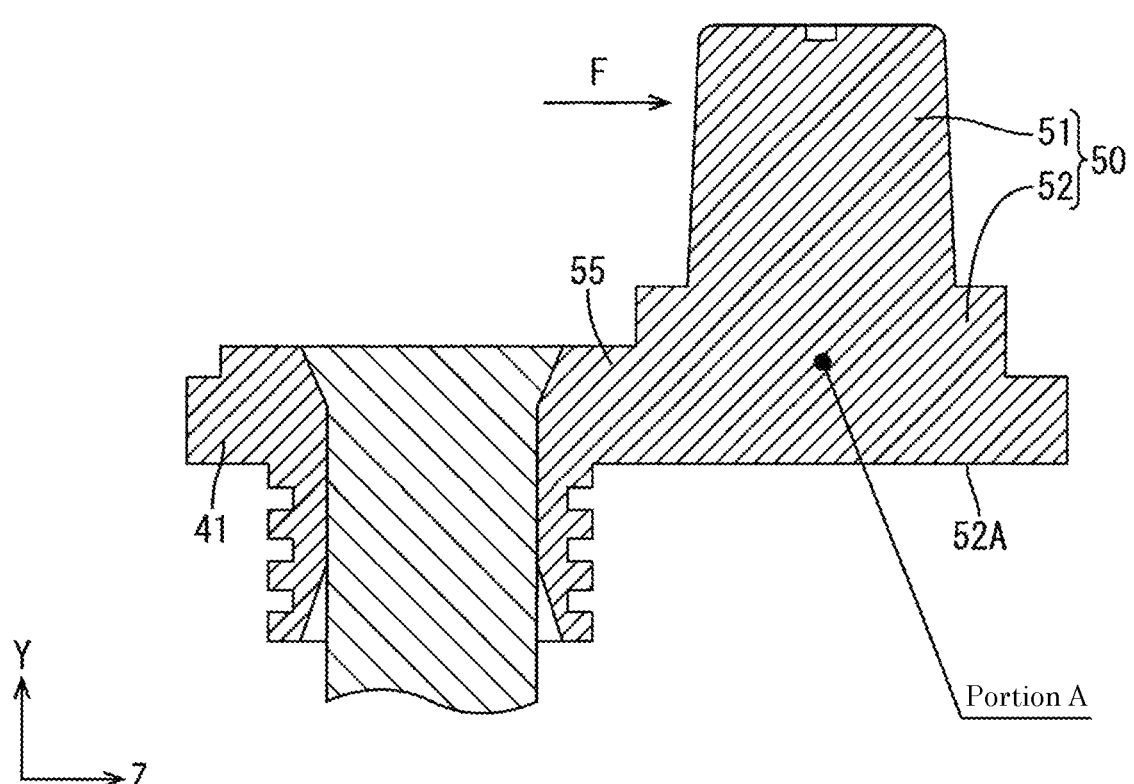
FIG. 8 is a cross-sectional view of the bushing without a cavity portion.

As shown in FIG. 5, the bushing 40A is embedded in the inner lid 60 except for a part thereof, and is fixed to the inner lid 60. As shown in FIG. 8, when an external force F in the horizontal direction is applied to the connecting portion 51, stress concentrates on the pedestal portion 52. Due to the concentration of the stress, the vicinity of the center of the bottom portion of the pedestal portion 52 (the vicinity of the portion A in FIG. 8) is deformed, and there is a concern that the bushing 40A may be broken. This problem is not limited to a case where the external force F is applied to the left peripheral surface of the connecting portion 51 from the left direction in FIG. 8, and is similarly applied to a case where the external force F in the horizontal direction is applied to the right peripheral surface of the connecting portion 51 from the right direction in FIG. 8.

In order to increase the strength of the terminal portion 50 and suppress the breakage of the bushing 40A, it is effective to reduce the stress (residual stress) remaining inside the pedestal portion 52. As shown in FIG. 7, by providing the recessed cavity portion 53 in the bottom surface 52A of the pedestal portion 52, the residual stress of the pedestal portion 52 is relaxed as compared with the case where the cavity portion 53 is not provided (see FIG. 8). Therefore, when the external force F in the horizontal direction is applied, the pedestal portion 52 is hardly deformed, and the breakage of the bushing 40A can be suppressed. In addition, by providing the cavity portion 53, the amount of material used is reduced, and the cost and weight of the bushing 40A can be reduced.

The reason why the residual stress is relaxed by providing the cavity portion 53 is as follows.

When the bushing 40A is molded by casting, the molten metal (lead alloy) poured into the mold is sequentially cooled and solidified from the surface toward the inside. Since the volume of the lead alloy decreases as the temperature decreases, strain due to a temperature difference between the surface and the inside occurs inside the pedestal portion 52 in the process of cooling, and stress remains inside (residual stress). In particular, since the vicinity of the center of the bottom portion of the pedestal portion 52 (the vicinity of the portion A in FIG. 8) is far from the surface, cooling is slower than other portions, and residual stress tends to remain.

By providing the cavity portion 53 in the pedestal portion 52, the entire pedestal portion 52 can be uniformly cooled, and the temperature difference between the surface and the inside at the time of cooling is reduced. Therefore, the residual stress of the pedestal portion 52 can be reduced. The method for manufacturing the bushing 40A is not limited to casting, and may be another manufacturing method as long as residual stress is generated in the pedestal portion 52.

When the diameter of the peripheral circle of the pedestal portion 52 is denoted by R1 and the diameter of the cavity portion 53 is denoted by R2, the value of R2/R1 with which the residual stress can be reduced is in the range of 0.25 to 0.40.

When the external terminal is assembled to the connecting portion 51, since the connecting portion 51 is strongly fastened from the outside, the connecting portion 51 is required to have a predetermined strength so as not to be deformed or damaged. In the bushing 40A according to the present embodiment, the ceiling surface 53A of the cavity portion 53 is located below the connecting portion 51.

In this configuration, the cavity portion 53 is not formed inside the connecting portion 51, and the connecting portion 51 and the cavity portion 53 do not overlap in the vertical direction. Since there is no cavity inside the connecting portion 51, it is possible to secure the strength of the terminal portion 50 so as not to be deformed or damaged even if the terminal portion 50 is fastened from the outside by an external terminal or the like.

When an overcurrent flows through the lead-acid battery 10, the coupling portion 55 is fused to cut off the overcurrent. Therefore, the lead-acid battery 10 can be protected from the overcurrent. Since the coupling portion 55 is located outside the lead-acid battery 10, it is possible to prevent fragments associated with fusing from being mixed into the lead-acid battery 10. In addition, the presence or absence of fusing can be easily visually recognized from the outside of the lead-acid battery 10.

<Other Embodiments>

The present invention is not limited to the embodiment described with reference to the above description and drawings, and for example, the following embodiments are also included in the technical scope of the present invention, and various modifications other than the following can be made without departing from the gist of the present invention.

(1) In the above embodiment, the ceiling surface 53A of the cavity portion 53 is located below the lower end 51A of the connecting portion 51, but the ceiling surface 53A may be located above the lower end 51A.

(2) The bushing 40A may have any shape as long as the bushing 40A includes the cylindrical bushing main body portion 41 in which the pole 45 is fitted and the terminal portion 50 located at a position offset from the bushing main body portion 41 in plan view. Further, as long as the cavity portion 53 is provided on the bottom surface 52A of the pedestal portion 52, the position and shape of the cavity are not limited.

(3) In the above embodiment, the case where the material of the bushing 40A is a lead alloy has been described, but any electrical conductor such as a metal or an alloy other than a lead alloy is included in the technical scope of the present invention.

DESCRIPTION OF REFERENCE SIGNS

40A: bushing (example of bushing for lead-acid battery)
41: bushing main body portion
45: pole
50: terminal portion
51: connecting portion
51A: lower end
52: pedestal portion
53: cavity portion
53A: ceiling surface
55: coupling portion
S1, S1A, S1B, S2, S3: cross-sectional area

The invention claimed is:

1. A bushing for a lead-acid battery, comprising:
a cylindrical bushing main body portion that can be fitted to a pole; and
a columnar terminal portion located at a position offset from the bushing main body portion in plan view,
wherein the terminal portion includes:
a pedestal portion integrally coupled to the bushing main body portion via a coupling portion; and
a connecting portion which is located on the pedestal portion and to which an external terminal is connected,
wherein the pedestal portion has a recessed cavity portion on a bottom surface of the pedestal portion,
wherein the terminal portion has a stepped columnar shape, and
wherein a diameter of the pedestal portion is larger than a diameter of the connecting portion.

2. The bushing for a lead-acid battery according to claim 1, wherein a ceiling surface of the cavity portion is located below the connecting portion.

3. The bushing for a lead-acid battery according to claim 1, wherein, on a current path from the terminal portion to the bushing main body portion via the coupling portion, a cross-sectional area of the coupling portion is smaller than a cross-sectional area of other portions when the cross-sectional areas of current paths are compared.

4. A lead-acid battery, comprising the bushing for a lead-acid battery according to claim 1.

5. The lead-acid battery according to claim 4, wherein the cavity portion of the pedestal portion is fitted with a boss portion of a lid member of the lead-acid battery.

6. The bushing for a lead-acid battery according to claim 1, wherein the stepped columnar shape includes a lower stage that is the pedestal portion and an upper stage that is the connecting portion.

\* \* \* \* \*